United States Patent [19]
Baker

[11] Patent Number: 5,848,129
[45] Date of Patent: Dec. 8, 1998

[54] ELECTRONIC BILLBOARD WITH TELEPHONE CALL-IN CONTROL

[76] Inventor: Earl Baker, P.O. Box 934, Eupora, Miss. 39744

[21] Appl. No.: 743,297

[22] Filed: Nov. 5, 1996

[51] Int. Cl.[6] .............. H04M 1/64; H04M 5/66; H04H 5/00; H04B 1/18; H04B 1/00
[52] U.S. Cl. .............. 379/67; 348/383; 348/744; 381/5; 455/18; 455/49; 455/67; 455/70; 455/158.4; 455/186.1; 455/500
[58] Field of Search .................. 379/67; 455/18, 455/49, 67, 70, 345, 158.4, 186.1, 500; 348/383, 744; 381/5

[56] References Cited

U.S. PATENT DOCUMENTS

| | | | |
|---|---|---|---|
| 4,027,107 | 5/1977 | Eilers | 381/5 |
| 5,133,081 | 7/1992 | Mayo | 455/18 |
| 5,193,214 | 3/1993 | Mardus et al. | 455/54.2 |
| 5,214,793 | 5/1993 | Conway et al. | 455/49.1 |
| 5,239,700 | 8/1993 | Guenther et al. | 455/158.4 |
| 5,612,741 | 3/1997 | Loban et al. | 348/383 |

*Primary Examiner*—Fan S. Tsang
*Assistant Examiner*—Allan Hoosain
*Attorney, Agent, or Firm*—Larson & Taylor

[57] ABSTRACT

A conventional billboard for displaying a visual message is combined with a communication system for enabling a message related to the message displayed by the billboard to be transmitted from the billboard to passengers of automotive vehicles driving by said billboard. The communication system includes a transmitter located at the billboard and connected to an external telephone line. A telephone unit, disposed at a remote business office, supplies the related message over the telephone line to the transmitter. Receivers, located in individual automotive vehicles, receive the transmitted message. The transmitter includes a recorder for recording the related message received from the telephone unit and a control unit for controlling recording and playback of that message.

1 Claim, 2 Drawing Sheets

ELECTRONIC BILLBOARD WITH TELEPHONE CALL-IN CONTROL

FIELD OF THE INVENTION

The present invention relates to billboards for presenting information to the occupants of automotive and other vehicles traveling along roadways and, more particularly, to an "electronic" billboard system which provides for transmission of remotely controlled, prerecorded messages to such vehicles.

BACKGROUND OF THE INVENTION

Although conventional billboards continue to maintain their popularity in many areas, one drawback of such billboards is that in order to change the message presented thereby, it is necessary to go to the site of the billboard and repaint, repaper or otherwise physically change the message. As a consequence, such billboards are, as a practical matter, unsuitable for presenting time dependent messages such as current room rates and the like.

So-called electronic billboards have been developed which provide for the electromagnetic transmission of information from a transmitter to passing vehicles. U.S. Pat. No. 5,214,793 to Conway et al. discloses an electronic billboard and vehicle traffic control communication system which is intended to replace existing billboards. Information transfer is effected using short bursts of microwave pulses from independent transmitters placed in selected locations along roadways. The transmitted signals are coded prior to transmission and decoded after being received by receivers in the vehicles. After decoding the pulses, a receiver will retrieve complete messages from a data base included as part of the in-vehicle receiver system. At the selection of the driver, the messages can be displayed or replayed audibly. The Conway et al. patent also describes other patented systems for communicating traffic and commercial information to drivers.

A number of other patents disclose communication systems wherein messages, usually relating to traffic and safety conditions, are transmitted to vehicle drivers. U.S. Pat. No. 5,020,143 to Duckeck et al. discloses a vehicular radio receiver for receiving messages such as traffic information. U.S. Pat. No. 4,816,827 to Baloutch et al. discloses a road safety installation which transmits signals to receivers in vehicles so as to provide messages to the vehicle drivers. U.S. Pat. No. 3,105,120 to Hanysz discloses a unidirectional triggering system for transmitting messages to moving vehicles equipped with receivers. Only vehicles traveling in a particular direction will receive the messages. Similarly, U.S. Pat. No. 3,105,119 to Cory, Jr. et al. discloses a communication system for transmitting messages to vehicles along highways wherein only vehicles in a limited area and traveling in a particular direction will receive the messages.

SUMMARY OF THE INVENTION

Generally speaking, in accordance with the invention, a billboard system is provided which produces, in addition to the visual message provided by an associated billboard, a related audio message that is transmitted to passing vehicles and which enables ready changing of the message to be transmitted, at all times of the day, by calling the change in over a telephone line from a remote location such as a business office or advertising agency. This ready control of the message to be transmitted provides enormous flexibility for an advertiser or other user. For example, the message can be adapted to changed circumstances or to provide updated information or new, timely presented data, by merely placing a telephone call.

According to a preferred embodiment of the invention, there is provided, in combination, a billboard for displaying a message, and a communication system for enabling a related message related to the message displayed by the billboard to be transmitted from said billboard to passengers of automotive vehicles driving by the billboard, the communication system including: transmitter means, located at the billboard, and connected to an external telephone line, for transmitting such a related message for reception by automotive vehicles driving by the billboard; at least one telephone unit, disposed at a location remote from the billboard and connected to the transmitter means through the telephone line, for supplying the related message over the external telephone line to the transmitter means for transmission by the transmitter means; and a plurality of receiver means, each located in an individual automotive vehicle, for receiving the message transmitted by the transmitter means when the corresponding automobile vehicle drives by the billboard, the transmitter means including recorder means for recording such a related message received from the telephone unit and a control unit for controlling recording and playback of the related message recorded by the recorder means responsive to control signals received from the telephone unit over the telephone line.

Preferably, the transmitter means includes a transmitter, and the telephone unit includes control means for generating said control signals as well as a further control signal for controlling activation of the transmitter to cause transmission of a related message. In one embodiment, the said control means comprises dedicated keys of the telephone unit although, advantageously, coded signals generated by pressing the keys of a conventional telephone keypad in a predetermined sequence can also be used. The transmitter preferably comprises a short range radio frequency transmitter.

The receiver means each preferably comprise a receiver controlled by signals from the transmitter means so as to ensure that the receiver receives and plays the related message at the beginning of that message. Advantageously, each receiver also includes means controlled by an occupant of the corresponding vehicle for providing repeating of the related message after that message has been played.

In a preferred implementation, the billboard comprises an electrified billboard including an electrical power supply, and the transmitter means receives electrical power from the electrical power supply.

Each said receiver means preferably comprises a directional receiver for receiving only messages directed to vehicles traveling in the same direction as the vehicle of the receiver is travelling. Preferably, the transmitter means comprises a transmitter for transmitting at one of four different characteristic frequencies, the four frequencies corresponding to four different directions of travel spaced apart angularly by 90°, and the receiver means comprises a four channel receiver for selectively receiving said four frequencies depending on the direction of travel of the vehicle in which the receiver is mounted.

Other features and advantages of the invention will be set forth in, or apparent from, the following detailed description of the preferred embodiment of the invention.

DESCRIPTION OF THE PREFERRED EMBODIMENTS

Figure 1:
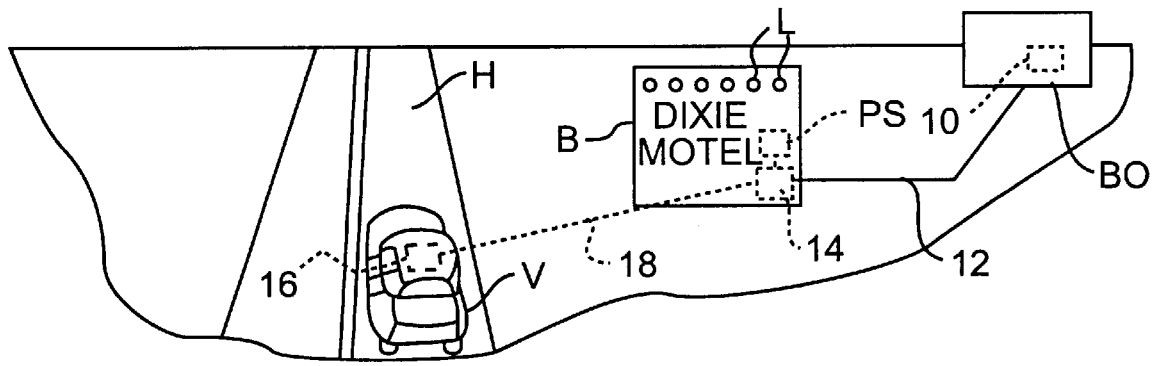
FIG. 1 is a schematic perspective view of a roadway with a vehicle traveling thereon, depicting the basic units of the billboard system of the invention.

Referring to FIG. 1, there is shown a schematic representation of the basic components of a preferred embodiment of the invention. A vehicle V is shown traveling on a highway or roadway H past a billboard B having a series of lights or lamps L thereon for illuminating the permanent signage indicated ("Dixie Motel"). The lights L are supplied with electrical power from a conventional power supply PS. A remote business office, which may be the office of an advertising agency, is indicated at BO. What has been described so far is, of course, conventional and billboard B can obviously take a number of different forms.

The business office BO is equipped with a telephone unit 10 which is described in more detail below. Unit 10 is connected by means of a telephone line 12 to a transmitter unit 14 located at billboard B. Transmitter unit 14 is supplied with electrical power by the power supply PS which provides electrical power for the lighting system of billboard B as described above. Transmitter unit 14, which is also described in more detail below, transmits messages, under the control of telephone unit 10, to a receiver 16 located in vehicle V, as is indicated by dashed line 18. As mentioned above, these messages are advantageously advertising or informational messages which may include, e.g., where the establishment sponsoring the message is a motel as indicated in FIG. 1, directions to the motel, room rates, availability of rooms, information about the motel eating facilities (if any), special features, and so on, and this information can be provided at any time, day or night.

Figure 2:
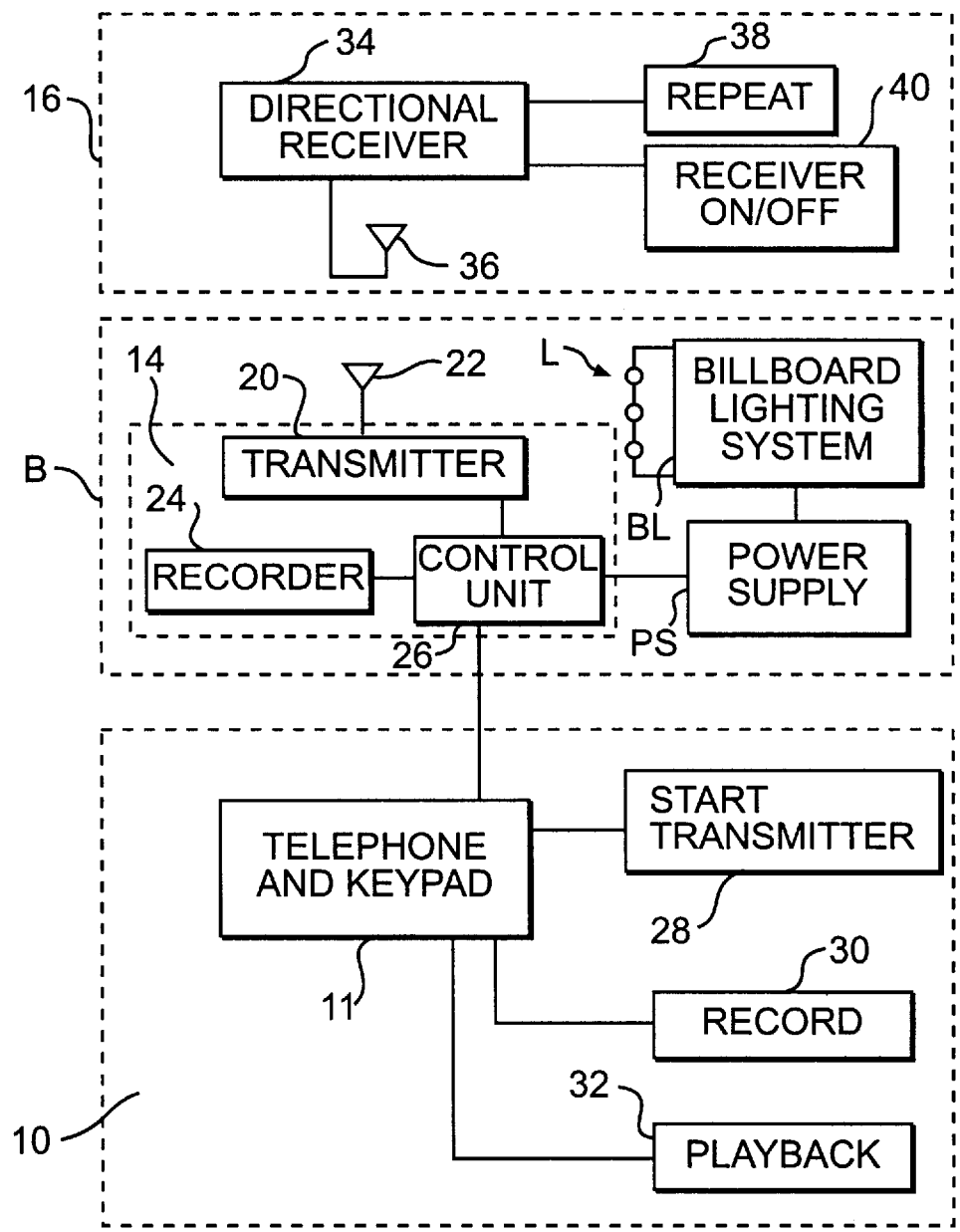
FIG. 2 is a block diagram of a billboard system in accordance with a preferred embodiment of the invention.

Referring to FIG. 2, a block diagram is provided of the basic units of the electronic billboard system of FIG. 1. As discussed above, the billboard B includes, as part of its standard operating equipment, the power supply PS mentioned previously and a billboard lighting system or lighting control system BL which controls the operation of lights or lamps L. As noted hereinbefore, transmitter unit 14 is powered from power supply PS. Transmitter unit 14 includes a transmitter 20 and associated transmitting antenna 22 which transmits recorded messages for reception by receiver 16. Transmitter 20 may comprise a conventional short range radio transmitter wherein a message recorded by a recorder 24 provides the audio input. Recorder 24, under the control of telephone unit 10, records and plays back outgoing messages for review by the operator of telephone unit 10 as is explained in more detail below. A control unit 26 manages and controls the operation of recorder 24 and transmitter 20. In a preferred embodiment, recorder 32 is of the digital type and has the capability of storing and playing back several outgoing messages, much in the same way as a conventional telephone answering machine can be controlled from a remote location and has the capability of storing more than one outgoing message.

Control unit 26 is connected to standard telephone line 12 and, in the preferred implementation under consideration, instructions are received from telephone unit 10 via touch-tone signals in basically the same way as a remote-access telephone answering machine is operated. In this embodiment, telephone unit 10 comprises a conventional touch-tone handset and a user who wishes to control the system simply calls the telephone number dedicated to the system (which would, of course, be an unlisted number) and inputs a series of touch-tone numbers by pressing keys on his or her telephone. A simple, exemplary set of sample touch-tone instructions is supplied in the table below, beginning with an access code which prevents unauthorized use of the system.

| Touch-Tone Code | Instruction |
| --- | --- |
| 2, 3, 8 | access code |
| 4, 1 | record outgoing message number 1 |
| 4, 2 | record outgoing message number 2 |
| 5, 1 | playback outgoing message number 1 |
| 5, 2 | playback outgoing message number 2 |
| 6, 4 | broadcast time at end of outgoing message |
| 6, 5 | broadcast date at end of outgoing message |
| 6, 6 | broadcast temperature at end of outgoing message |

In an alternative embodiment, telephone unit 10 may include separate dedicated controls or pushbuttons as indicated at 28, 30 and 32 for generating specialized tones or coded signals for, respectively, starting the transmitter 10, controlling recording by recorder 24 and controlling playback by said recorder 24.

As illustrated in FIG. 2, receiver unit 16 includes a directional receiver 34 including an receiving antenna 36. Special controls may be provided as indicated at 38 and 40 for, respectively, enabling a message to be repeated and controlling turning of the receiver on and off. In a preferred embodiment, in order to enable reception by vehicles traveling in a particular direction only, an electronic compass is provided in each receiver unit 16 such that the associated receiver 34 is tuned to one of four different frequencies depending on the direction of travel of the vehicle, i.e., tuned to a north, east, south, or west frequency corresponding to the approximate direction of vehicle travel. Receiver 34 advantageously comprises an automotive vehicle receiver built as a separate unit for mounting on a vehicle dashboard or console. Power can be provided from batteries or the unit can plug into a cigarette lighter in the same way as other auxiliary electrical or electronic devices do.

Figure 3:
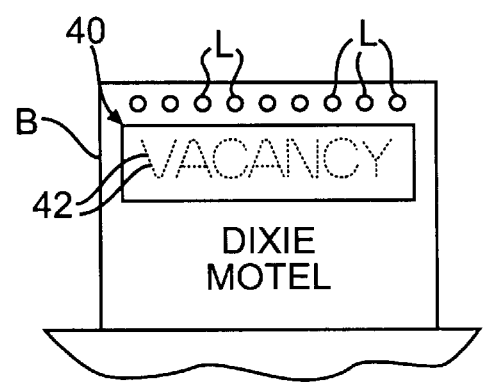
FIG. 3 is a schematic front elevational view of a further embodiment of the billboard of the billboard system.

In an advantageous system, a changeable message board 40 is also provided on the billboard B as shown in FIG. 3. The changeable message board 40 is preferably of the type using a matrix of lights 42 which are alternatively illuminated to form text and graphics. The messages to be displayed on the changeable message board can be programmed remotely via the alpha-numeric keypad of the remote telephone unit 10 or the message board 40 may have several messages pre-programmed into memory so that a particular message can be simply selected via the remote telephone unit 10. Advantageously, the control unit 26 is programmed to select a particular message board message to correspond to a user-selected outgoing audio message. For example, if the billboard B is being used by a motel as illustrated, the motel manager may call the billboard B and input the proper code to play a "vacancy" message. This code would be so interpreted by the control unit 26 which would then select both the appropriate audio recorded message from recorder 24 for broadcast by transmitter 20 and the proper visual message for the changeable message board 40 to display.

Considering the overall operation of the basic system (i.e., without message board 40), a telephone call is placed from telephone unit 10 by a user such as a business office or an advertising agency to the transmitter unit 14 at the billboard B. By using the telephone push buttons of the telephone unit to generate a particular coded signal or, alternatively, using dedicated keys or pushbuttons, e.g., record key 30, the recorder 24 can be turned on and an advertisement or other message can be recorded. To play the message back, a further code is generated by depressing the appropriate pushbuttons (or alternatively, using separate dedicated key 32) and the playback mode of recorder 24 will be activated and recorder 24 will play the message back. Once satisfied with the message, the user can use the telephone keys to enter a further code (or, alternatively, use "start transmitter" key 28) to start the transmitter 20 so as to transmit the recorded message.

Considering the operation at receiver unit 16, as stated above, transmitter 20 advantageously has a very short range, and, in a specific exemplary implementation, a predetermined frequency or tone is provided at the beginning of each transmitted message which will automatically turn on the receiver 34. This will ensure that the transmitted message is received and heard from the beginning of the message rather than in the middle or the end. When the message reaches the end, a further frequency or tone is received from the transmitter 20 which will automatically turn off receiver 34. If the user at the receiver unit 16 wishes to hear the message again, the repeat key or button 38 can be pressed to accomplish this. The receiver unit 16 is preferably designed such that the receiver 34 will not be activated or turned on again until the vehicle V comes in range of the next billboard.

To provide the directionality discussed above, the transmitter 20 will, as indicated previously, transmit four different frequencies, one for billboards on the northbound highway or roadway, one for the southbound highway, one for eastbound highway and one for the westbound highway. In this way, a receiver 34 will be prevented from receiving messages other than that intended for vehicles traveling in the direction that the vehicle is traveling. Correspondingly, receiver 34 preferably comprises a four channel receiver with one channel for each direction or, alternatively, uses other suitable conventional electronics for providing directional reception. Other techniques such as those disclosed in the Hanysz and Cory, Jr. patents discussed above can also be used.

Although the present invention has been described to specific exemplary embodiments thereof, it will be understood by those skilled in the art that variations and modifications can be effected in these exemplary embodiments without departing from the scope and spirit of the invention.

What is claimed is:

1. In combination, an electrified billboard including permanent signage thereon including electrical lamps for illuminating the signage on the billboard and an electrical system for providing electrical power to said lamps, and a communication system for enabling messages to be transmitted form said billboard to passengers of automotive vehicles driving by said billboard, said communication system including: transmitter means, connected to said electrical system at said billboard, so as to be supplied with electrical power from said electrical system and connected to an external telephone line, for transmitting a message for reception by automotive vehicles driving by said billboard in a predetermined direction; at least one telephone unit, disposed at a location remote from said billboard and connected to said transmitter means through said telephone line, for supplying a message over said external telephone line to said transmitter means for transmission by said transmitter means, said telephone unit including a touch tone handset; and a plurality of receiver means each located in an individual automotive vehicle for receiving a message transmitted by said transmitter means when the corresponding automobile vehicle drives by said billboard, said transmitter means including recorder means for recording a message received from said telephone unit and control means for receiving touch tone control signals from said touch tone handset of said telephone unit over said telephone line and for decoding said touch tone control signals to first determine whether said control signals include an access code and, if an access code is included, controlling recording and playback of a message recorded by said recorder means responsive to further decoded touch tone control signals received from said touch tone handset of said telephone unit over said telephone line, said transmitter means including a transmitter and said handset of said telephone unit generating an additional control signal for controlling activation of said transmitter to cause transmission of a said related message, said handset comprising a dedicated record button and a dedicated playback button for generating said control signals for controlling recording and playback of a message, and said receiver means each comprising an electronic compass and a receiver controlled by signals from said transmitter means so as to ensure that the receiver receives and plays a said related message at the beginning of said related message and an electronic compass for providing tuning of the receiver to a preselected frequency based on the direction of travel of the vehicle, each said receiver further including a dedicated repeat button controlled by an occupant of the corresponding vehicle for providing for repeating of a said related message after said related message has first been played.

* * * * *